United States Patent
Kaplun et al.

(10) Patent No.: US 6,870,904 B2
(45) Date of Patent: Mar. 22, 2005

(54) ALARM MECHANISM

(75) Inventors: Mark Kaplun, Modiin (IL); Amir Cohen, Kfar Hes (IL)

(73) Assignee: Teledata Networks Ltd., Herzliya (IL)

( * ) Notice: Subject to any disclaimer, the term of this patent is extended or adjusted under 35 U.S.C. 154(b) by 271 days.

(21) Appl. No.: 09/783,626

(22) Filed: Feb. 14, 2001

(65) Prior Publication Data

US 2002/0110223 A1 Aug. 15, 2002

(Under 37 CFR 1.47)

(51) Int. Cl.[7] .......................... H04M 1/24; H04M 3/08; H04M 3/22
(52) U.S. Cl. ...................... 379/33; 379/9.02; 379/9.03; 379/32.01; 340/500; 340/506; 700/12; 700/80
(58) Field of Search .................. 379/1.01, 9, 9.01, 379/9.03, 9.06, 14, 14.01, 15.01, 22, 22.03, 24.44, 32.01, 33, 22.04; 370/241, 242, 244; 714/1, 25, 30, 31, 39, 43, 48, 49; 340/945, 971, 425.5, 426, 428, 438, 500, 506, 3.1; 700/12, 80, 83

(56) References Cited

U.S. PATENT DOCUMENTS

| | | | | |
|---|---|---|---|---|
| 4,388,715 A | * | 6/1983 | Renaudin et al. ........... 370/244 |
| RE32,468 E | * | 8/1987 | Le Nay et al. ............. 340/506 |
| 4,817,092 A | * | 3/1989 | Denny .......................... 714/10 |
| 5,375,150 A | * | 12/1994 | Scarola et al. .............. 376/216 |
| 5,426,688 A | * | 6/1995 | Anand ..................... 379/22.03 |
| 5,475,696 A | | 12/1995 | Taniguchi |
| 5,495,470 A | * | 2/1996 | Tyburski et al. ............ 370/248 |
| 5,920,258 A | * | 7/1999 | Kusyk et al. ............... 340/506 |
| 5,946,373 A | * | 8/1999 | Harris ...................... 379/26.01 |
| 6,044,403 A | | 3/2000 | Gerszberg et al. |
| H1860 H | * | 9/2000 | Asthana et al. ................ 379/9 |
| 6,115,355 A | | 9/2000 | Rao |
| 6,381,269 B1 | * | 4/2002 | Gradl et al. ................. 375/224 |
| 6,492,901 B1 | * | 12/2002 | Ridolfo ...................... 340/506 |

FOREIGN PATENT DOCUMENTS

WO    WO 00/77990 A1    12/2000

* cited by examiner

Primary Examiner—Quoc Tran
(74) Attorney, Agent, or Firm—Blakely Sokoloff Taylor & Zafman LLP

(57) ABSTRACT

An alarm mechanism is provided. The alarm mechanism includes a hardware component and a software component. The hardware component includes first and second registers. The first register is adapted to store a value that indicates a change in state of at least one alarm and the second register is adapted to store current states of each of the at least one alarm. The software component is responsive to interrupt requests from the hardware component and is adapted to read the first and second registers.

17 Claims, 2 Drawing Sheets

ALARM MECHANISM

CROSS REFERENCE TO RELATED APPLICATIONS

This application is related to commonly assigned, co-pending U.S. application Ser. No. 09/334,431, entitled "CLIENT/SERVER ARCHITECTURE FOR A TELECOMMUNICATIONS NETWORK" and filed on Jun. 16, 1999.

TECHNICAL FIELD

The present invention relates generally to the field of electronic circuits and, in particular, to alarm mechanisms for reporting alarm states and changes in alarm states.

BACKGROUND

Electronic equipment often includes circuitry that monitors the operation of the electronic equipment. This circuitry typically generates alarms when the equipment is not operating within normal parameters. For example, telecommunications equipment often includes circuitry that determines whether lines associated with a line card are operating properly. Such alarm mechanisms typically include software and hardware components that operate together to report alarm conditions.

In one conventional approach, the hardware component of the alarm mechanism indicates when an alarm changes from a first state, e.g., a non-alarm state, to an alarm state by an interrupt to the software component. Unfortunately, in this mechanism, the hardware typically does not provide an indication when an alarm changes from an alarm state back to a non-alarm state. Thus, the software typically polls the hardware on some recurring basis or uses some other mechanism to determine state changes back to the first or non-alarm state. This imposes an extra burden in developing the software code for the electronic equipment.

In other approaches, the software component of the alarm mechanism maintains an image of the current state of each alarm. When the hardware component indicates that an alarm has changed states, e.g., via an interrupt, the software component reads the current state conditions from the hardware and compares the current states with the image maintained in the software component to determine which alarm changed states. Unfortunately, this approach also requires a significant burden on the software to obtain the needed information since the software component has to maintain and process the current state information each time an interrupt is received.

For the reasons stated above, and for other reasons stated below which will become apparent to those skilled in the art upon reading and understanding the present specification, there is a need in the art for an improved alarm mechanism for electronic equipment that readily provides alarm information.

SUMMARY

The above-mentioned problems with alarm mechanisms and other problems are addressed by embodiments of the present invention and will be understood by reading and studying the following specification. Embodiments of the present invention provide an alarm mechanism that uses hardware registers to provide software components with both the current state of the alarm indicators and whether one or more of the indicators has changed states.

More particularly, in one embodiment an alarm mechanism is provided. The alarm mechanism includes a hardware component and a software component. The hardware component includes first and second registers. The first register is adapted to store a value that indicates a change in state of at least one alarm and the second register is adapted to store current states of each of the at least one alarm. The software component is responsive to interrupt requests from the hardware component and is adapted to read the first and second registers.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Figure 1:
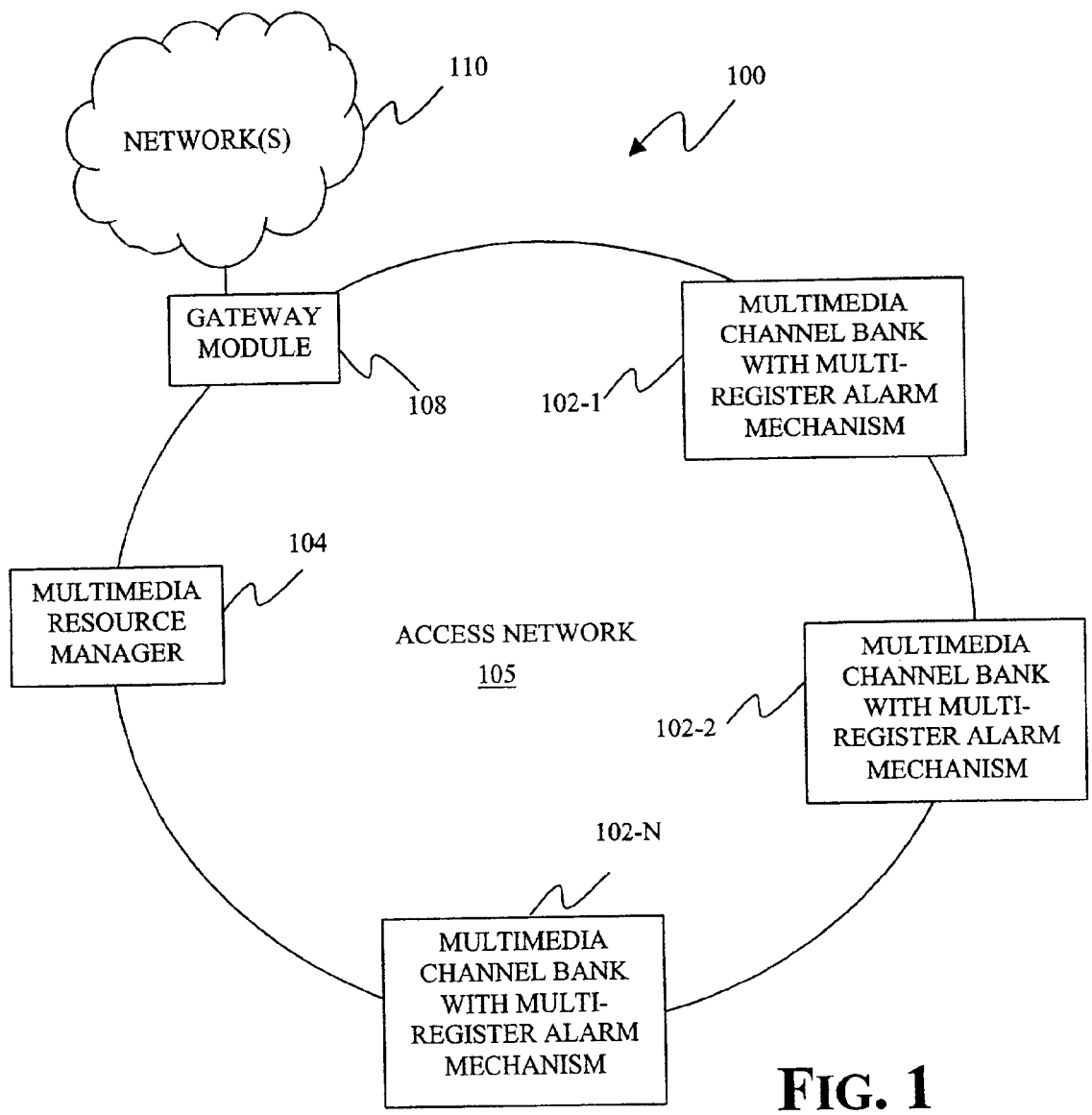
FIG. 1 is a block diagram of an embodiment of a telecommunications system including an alarm mechanism according to the teachings of the present invention.

FIG. 1 is a block diagram of an embodiment of a telecommunications system, indicated generally at 100, including an alarm mechanism according to the teachings of the present invention. The alarm mechanism is implemented in a plurality of multimedia channel banks 102-1, ..., 102-N of access network 105. Multimedia channel banks 102-1, ..., 102-N each include a plurality of line cards such as Plain Old Fashioned Telephone Service (POTS), Digital Subscriber Line (DSL) and Integrated Digital Services Network (ISDN) line cards. In one embodiment, the alarm mechanism monitors the states of a plurality of alarms of the multimedia channel bank. For example, the alarm mechanism in one embodiment monitors the states of a plurality of alarms associated with serial low voltage differential signal (LVDS) lines on the backplane of the multimedia channel bank or other access device. In this embodiment, an alarm state is generated when successive cells of the serial line include corrupted synchronization patterns. The successive cells may comprise actual data or idle cells. In other embodiments, the alarm mechanism monitors a plurality of alarms in an access device such as a digital loop carrier. In other embodiments, the alarm mechanism monitors the state of other alarms associated with other aspects of the access device.

Access network 105 couples multimedia channel banks 102-1, ..., 102-N with multimedia resource manager 104 and gateway module 108. Gateway module 108 provides connection to one or more networks 110, e.g., the Public Switched Telephone Network (PSTN), the Internet, or other appropriate telecommunications network. An example of an access network 105 is shown and described in commonly assigned, co-pending application Ser. No. 09/334,431, entitled "CLIENT/SERVER BASED ARCHITECTURE FOR A TELECOMMUNICATIONS NETWORK" filed on Jun. 16, 1999 (the "'431 application"). The '431 application is incorporated by reference.

In one embodiment, multimedia channel banks 102-1, . . . , 102-N each include a hardware component and a software component that work together to provide a multi-register alarm mechanism. In one embodiment, the hardware component of the alarm mechanism includes first and second registers. The first register is adapted to store a value that indicates when an alarm of the multimedia channel bank changes states at least once, e.g., a selected alarm changes from an alarm state to a non-alarm state or from a non-alarm state to an alarm state. The second register is adapted to store current states of each of the alarms for the multimedia channel bank.

In operation, the multi-register alarm mechanism of, for example, multimedia channel bank 102-1, monitors the status of a plurality of alarms. When an alarm of multimedia channel bank 102-1 changes states, the fact that the alarm changed states is recorded in the first register of the hardware component of the alarm mechanism. For example, a bit in the first register is set to a high logic value to indicate that the state of the associated alarm has changed. Further, the current state of the alarm is recorded in the second register of the hardware component. For example, a bit in the second register associated with the alarm is set to a high logic value for an alarm state or a low logic value for a non-alarm state. Upon the change in states, the hardware component interrupts the software component to provide the updated information to the software component. In this manner, both the current state of the alarms of multimedia channel bank 102-1 and an indication of which of the alarms have changed states at least once is provided to the software for use in managing the operation of the multimedia channel bank 102-1.

Figure 2:
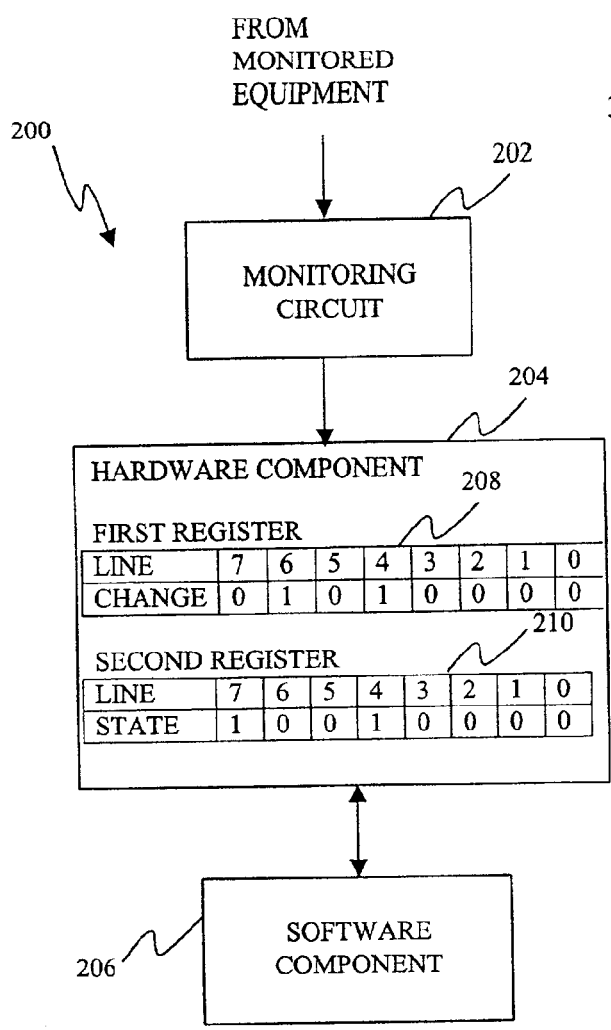
FIG. 2 is a block diagram of an embodiment of an alarm mechanism according to the teachings of the present invention.

FIG. 2 is a block diagram of an embodiment of an alarm mechanism, indicated generally at 200, according to the teachings of the present invention. Alarm mechanism 200 includes hardware component 204 and software component 206. Alarm mechanism 200 receives information from monitored equipment via monitoring circuit 202. Hardware component 204 includes first and second registers 208 and 210. In one embodiment, each of the bits of first register 208 corresponds to a serial low voltage differential signal (LVDS) line on a backplane of an access device of a telecommunications network. In other embodiments, each bit in first register 208 is associated with a selected alarm of an electronic circuit. First register 208 stores a value in each bit location that indicates whether an associated alarm has changed states since the last reading of first register 208. In the example shown in FIG. 2, the alarms associated with bits 4 and 6 of first register 208 have changed states as indicated by the high logic value stored in these bit locations in the row labeled "CHANGE". Further, the alarms associated with bit locations 0–3, 5, and 7 have not changes states as indicated by the low logic levels stored in these locations.

Second register 210 also is a multi-bit register with each bit associated with a selected alarm, e.g., an alarm for a serial line on the backplane of an access device of a telecommunications network. Each bit in second register 210 stores the current state of each monitored alarm. In the example shown in FIG. 2, the alarms associated with bit places 4 and 7 are shown as being in an alarm state, e.g., as indicated by a high logic value, and the remaining bit locations 0–3, 5 and 6, are shown as being in a non-alarm state, e.g., as indicated by a low logic value.

In operation, software component 206 and hardware component to 204 function together to monitor the states of various alarms. Monitoring circuit 202 monitors the operation of the equipment. When an alarm condition changes, this information is reported to hardware component to 204 by monitoring circuit 206. The changed alarm condition is recorded in first and second registers 208 and 210, respectively. Namely, the current state of the alarm is recorded in a bit location in second register 210 associated with monitored alarm. Further, an indication is stored in the corresponding bit location of first register 208 to indicate that the associated alarm has changed states. Once the bit location in first register 208 indicates a change in states for a selected alarm, this value remains unchanged even in light of further changes to the state of the alarm until such time that the value is read by the software component. When a change in states is detected, and information is recorded, an interrupt notifies the software component 206 such that software component 206 reads the values in first register 208 and second register 210.

Figure 3:
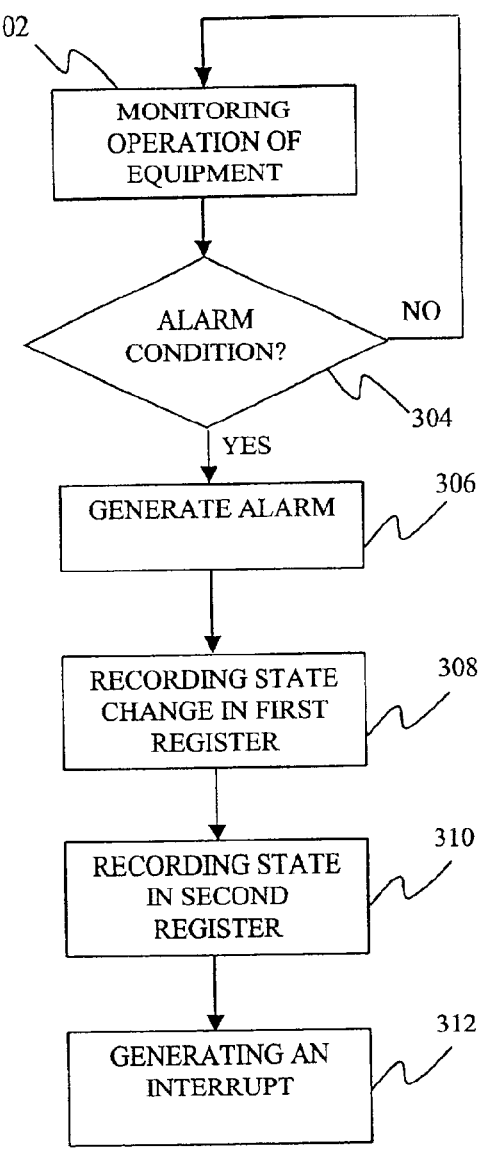
FIG. 3 is a flow chart that illustrates an embodiment of a process for an alarm mechanism according to the teachings of the present invention.

FIG. 3 is a flow chart that illustrates an embodiment of a process for an alarm mechanism according to the teachings of the present invention. The method begins at 302 and monitors the operation of electronic equipment, e.g., serial low voltage differential signal (LVDS) lines on a backplane of an access device in the telecommunications network. At block 304, the method determines whether an alarm condition exists. If not, the method returns to block 302. If however, the method determines that an alarm condition exists, the method proceeds to block 306.

At block 306, an alarm is generated. Further, at block 308, the method records a change in state of the alarm in a first register. For example, when an alarm changes from a non-alarm state to an alarm state, a high logic value is recorded in the bit location of the first register associated with the alarm. Similarly, when the alarm changes from an alarm state to a non-alarm state, a high logic value is also recorded in the bit location of the first register associated with the alarm. Once a bit location is changed to a high logic level, the bit value does not change until it is read by a software component and reset to a low logic value.

At block 310, the method records the state of the alarm in a second register. For example, the method records a high logic value for an alarm in an alarm state and a low logic value for an alarm in a non-alarm state. At block 312, the method generates an interrupt to the software component of the alarm mechanism indicating that a change in state has been recorded by the hardware component.

CONCLUSION

Embodiments of the present invention have been described. The embodiments provide an alarm mechanism having both a hardware component and a software component. The hardware component includes at least first and second registers. The first register stores an indication of a change in state of at least one alarm monitored by the alarm mechanism. The second register stores the current state of the alarms monitored by the alarm mechanism. The values in these registers are read by software based on an interrupt from the hardware.

Although specific embodiments have been illustrated and described in this specification, it will be appreciated by those of ordinary skill in the art that any arrangement that is calculated to achieve the same purpose may be substituted for the specific embodiment shown. This application is intended to cover any adaptations or variations of the present invention. For example, embodiments have been described in terms of an alarm mechanism for an access device in a telecommunications network. It is understood, however, that the alarm mechanism described is not limited to use in an access device for a telecommunications network. Rather, the alarm mechanism in other embodiments is used in other appropriate electronic equipment. Further, the alarm mechanism is not limited to use in monitoring serial lines on a backplane of an access device. The alarm mechanism in other embodiments monitors other alarms in other electronic equipment. Further, the logic levels for the bits of the first and second registers in other embodiments are inverted from the embodiments described here.

What is claimed is:

1. A method for monitoring alarm conditions, the method comprising:
   receiving an indication of a change in state of an alarm;
   recording the change in state of the alarm in a first register;
   recording the current state of the changed alarm in a second register; generating an interrupt;
   wherein receiving an indication of a change in state of an alarm comprises receiving an indication of an alarm condition when at least two cells are received on communication line with corrupted synchronization patterns.

2. A telecommunications system, comprising:
   at least one access device having a plurality of ports adapted to couple to a plurality of subscriber lines;
   a plurality of line cards disposed in the at least one access device and providing the plurality of ports;
   a monitoring circuit disposed in the access device, the monitoring circuit adapted to monitor for alarm conditions for the at least one access device; and
   an alarm mechanism, communicatively coupled to the monitoring circuit, the alarm mechanism including:
      a hardware component, including first and second registers, the first register adapted to store a value that indicates a change in state of at least one alarm and the second register adapted to store current states of each of the at least one alarm, and
      a software component, responsive to interrupt requests from the hardware component, adapted to read the first and second registers.

3. The telecommunications system of claim 2, wherein the access device comprises a multimedia channel bank.

4. The telecommunications system of claim 2, wherein the access device comprises a digital loop carrier.

5. The telecommunications system of claim 2, wherein the monitoring circuit comprises a monitoring circuit that monitors serial lines on the backplane of the access device.

6. The telecommunications system of claim 2, wherein the line cards comprise at least one of Plain Old Fashion Telephone Service (POTS), digital subscriber line (DSL), and Integrated Services Digital Network (ISDN).

7. The telecommunications system of claim 2, wherein the first and second registers comprise first and second n-bit registers.

8. The telecommunications system of claim 2, wherein the second register is adapted to store a first logic value for an alarm state and a second logic value for a non-alarm state.

9. The telecommunications system of claim 2, wherein the first register is adapted to store a first value in a bit location of the first register upon one or more changes in state of the corresponding alarm.

10. An alarm mechanism for a telecommunications access device, comprising:
    at least one alarm associated with each of a plurality of serial low voltage differential signal (LVDS) lines of the access device;
    a first n-bit register, responsive to the at least one alarm and adapted to store a value that indicates a change in state of the at least one alarm;
    a second n-bit register, responsive to the at least one alarm, and adapted to store current states of each of the at least one alarm; and
    wherein corresponding bits of the first and second n-bit registers are associated with a corresponding alarm and a corresponding LVDS line.

11. The alarm mechanism of claim 10, wherein the second register is adapted to store a first logic value for an alarm state and a second logic value for a non-alarm state.

12. The alarm mechanism of claim 10, wherein the first register is adapted to store a first value in a bit location of the first register upon one or more changes in state of the corresponding alarm indicator.

13. A method for monitoring alarm conditions in an access device, the method comprising:
    monitoring a plurality of serial lines on a back plane of the access device;
    when successive cells have corrupted synchronization patterns, generating an alarm;
    receiving the alarm;
    recording a change in state of an alarm in a first n-bit register;
    recording the current state of the changed alarm in a second n-bit register; and
    generating an interrupt for a software component to read the first and second n-bit registers.

14. The method of claim 13, wherein receiving an alarm indicator comprises receiving an indication of an alarm condition in a serial line on the backplane of an access device.

15. The method of claim 13, wherein recording a change in state comprises recording a first logic value in a bit location of the first n-bit register.

16. The method of claim 13, wherein recording the current state comprises recording a first logic value in a bit location of the second n-bit register.

17. The method of claim 13, wherein receiving the alarm comprises receiving an indication of an alarm condition when at least two cells are received on communication line with corrupted synchronization patterns.

* * * * *